United States Patent [19]

Ishii

[11] Patent Number: 4,998,100
[45] Date of Patent: Mar. 5, 1991

[54] DISPLAY CONTROL SYSTEM
[75] Inventor: Takatoshi Ishii, Tokyo, Japan
[73] Assignee: Ascii Corporation, Tokyo, Japan
[21] Appl. No.: 409,933
[22] Filed: Sep. 20, 1989

Related U.S. Application Data

[62] Division of Ser. No. 752,578, Jul. 8, 1985, abandoned.

[30] Foreign Application Priority Data

Jul. 13, 1984 [JP] Japan ................................ 59-145579

[51] Int. Cl.⁵ .............................................. G09G 3/36
[52] U.S. Cl. ..................................... 340/784; 340/805; 340/814; 358/236
[58] Field of Search ............... 340/784, 805, 813, 814, 340/802, 750, 799; 358/236, 241; 350/330, 332

[56] References Cited

U.S. PATENT DOCUMENTS

| | | | |
|---|---|---|---|
| 4,388,621 | 6/1983 | Komatsu et al. | 340/802 |
| 4,468,662 | 8/1984 | Tanaka | 340/750 |
| 4,546,350 | 10/1985 | Tanaka | 340/750 |
| 4,556,879 | 12/1985 | Tanaka | 340/799 |
| 4,604,615 | 8/1986 | Funahashi | 340/799 |

FOREIGN PATENT DOCUMENTS 58-59490 4/1983 Japan.

Primary Examiner—Alvin E. Oberley
Assistant Examiner—M. Fatahiyar
Attorney, Agent, or Firm—Koda and Androlia

[57] ABSTRACT

A display control circuit system is disclosed which, while maintaining the compatibility of software perfectly, can realize various specifications of the software, provides for a gradation display in an LCD display to realize substantially the same level of access as in a CRT display, permits a configuration control, and, when one or more bits are expanded in the conventional software, can protect the function-expanded bit(s). The display control system includes a mode selector to select either a mode for controlling the display of CRT or a mode for controlling the display of LCD, a controller for controlling the CRT display, and a controller for controlling the LCD display control.

1 Claim, 18 Drawing Sheets

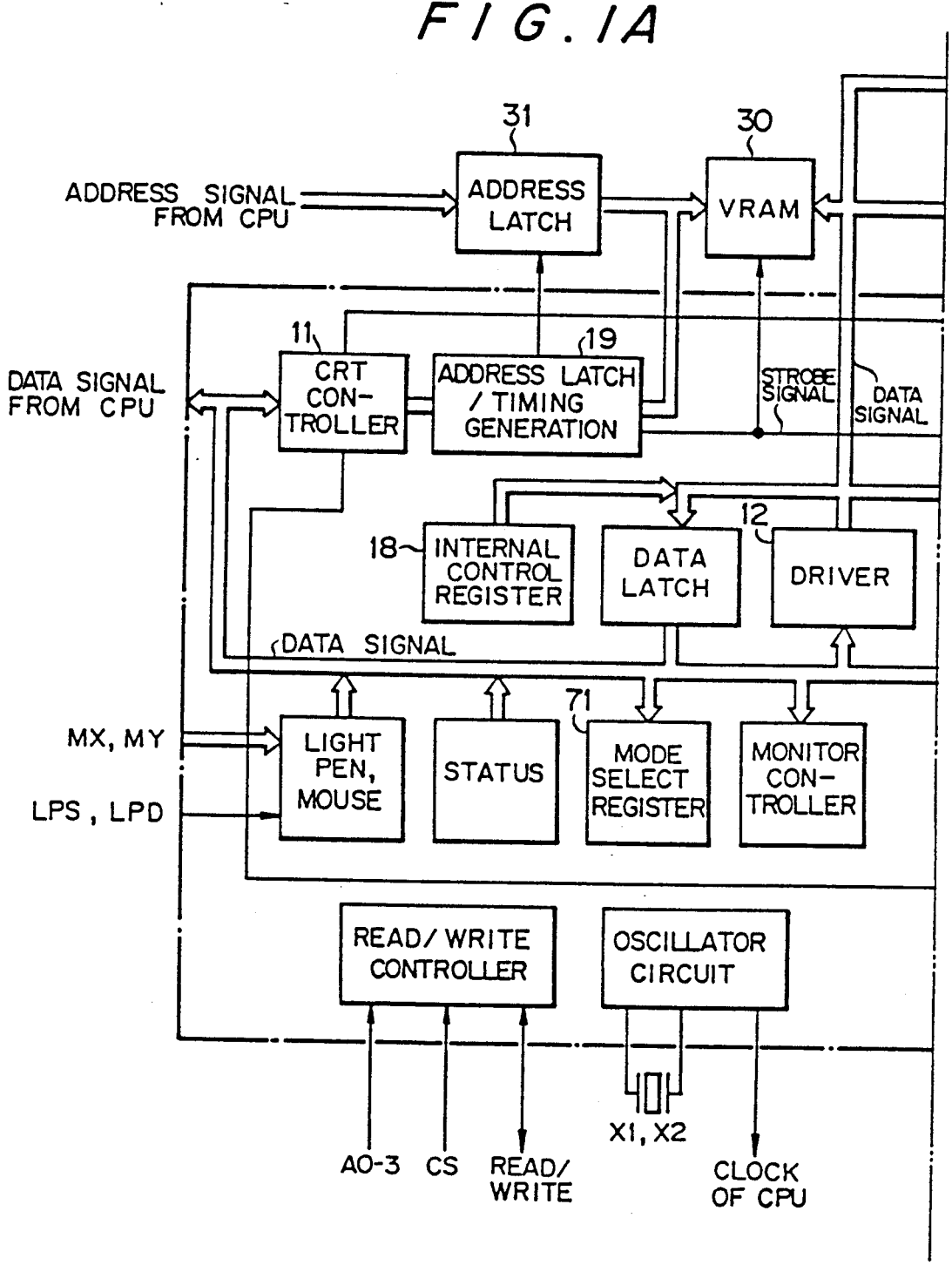

F I G. 2

I/O REGISTER

| ADDRESS | | | | | DATA | | | | | | | | READ/WRITE | FUNCTION OF REGISTER |
|---|---|---|---|---|---|---|---|---|---|---|---|---|---|---|
| HEX | 3 | 2 | 1 | 0 | 7 | 6 | 5 | 4 | 3 | 2 | 1 | 0 | | |
| 0,2,4,6 | 0 | x | x | x | x | x | x | A4 |   |   |   | A0 | W | CRT ADDRESS REGISTER |
| 1,3,5,7 | 0 | x | x | 1 | D7 |   |   |   |   |   |   | D0 | R/W | CRT DATA REGISTER |
| 8 | 1 | 0 | 0 | 0 | D7 |   |   |   |   |   |   | D0 | R/W | MODE CONTROL / ID REGISTER |
| 9 | 1 | 0 | 0 | 1 | x | x | D5 |   |   |   |   | D0 | W | COLOR SELECT REGISTER |
| A | 1 | 0 | 1 | 0 | x | x | x | D4 |   |   |   | D0 | R | STATUS REGISTER |
| B | 1 | 0 | 1 | 1 | x | x | x | x | x | x | x | x | W | CLEAR LIGHT PEN |
| C | 1 | 1 | 0 | 0 | x | x | x | x | x | x | x | x | W | PRESET LIGHT PEN |
| D | 1 | 1 | 0 | 1 | P | D6 |   |   |   |   |   | D0 | W | REGISTER BANK ADDRESS |
| E | 1 | 1 | 1 | 0 | D7 |   |   |   |   |   |   | D0 | W | REGISTER BANK DATA |
| F | 1 | 1 | 1 | 1 | x | x | x | x | x | x | D2 | D0 | W | DISPLAY PAGE |

X : DON'T-CARE

FIG. 3

REGISTER BANK

| ADDRESS (D6~D0) | DATA | | | | | | | | FUNCTION OF REGISTER |
|---|---|---|---|---|---|---|---|---|---|
| 6543210 | 7 | 6 | 5 | 4 | 3 | 2 | 1 | 0 | |
| 0000000 | D7 | D6 | D5 | D4 | D3 | D2 | D1 | D0 | SPRITE PATTERN DATA |
| ⋮ | ↓ | ↓ | ↓ | ↓ | ↓ | ↓ | ↓ | ↓ | |
| 0111111 | D7 | D6 | D5 | D4 | D3 | D2 | D1 | D0 | |
| 1000001 1000001 | X X | X G2 | X G1 | X G0 | X X | R2 B2 | R1 B1 | R0 B0 | COLOR PALLET #0 |
| ⋮ | ↓ | ↓ | ↓ | ↓ | ↓ | ↓ | ↓ | ↓ | ↓ |
| 1011110 1011111 | X X | X G2 | X G1 | X G0 | X X | R2 B2 | R1 B1 | R0 B0 | COLOR PALLET #15 |
| 1100000 1100001 | X H7 | X H6 | X H5 | X H4 | X H3 | X H2 | H9 H1 | H8 H0 | SPRITE HORIZONTAL POSITION |
| 1100010 1100011 | X V7 | X V6 | X V5 | X V4 | X V3 | X V2 | X V1 | X V0 | SPRITE VERTICAL POSITION |
| 1100100 | X | X | ON | BL | I | R | G | B | SPRITE CONTROL /COLOR SELECT |
| 1100101 | Mouse | SRAM | LCD | MONO | PAL | 512/250 | SCR 1 | SCR 0 | MONITOR CONTROL |
| 1100110 | TEST 1 | TEST 0 | LCD 3 | MODE 2 | MODE 1 | MODE 0 | RAJ 1 | RAJ 0 | TEST/LCD CONTROL/RASTER ADJUST |
| 1100111 | 16 bit | PAGE | MSEL | EH 4 | EH 3 | EH 2 | EH 1 | EH 0 | MIXED MODE |
| 1101000 | D7 | | | | | | | D0 | CONTROL REGISTER |

X: DON'T-CARE

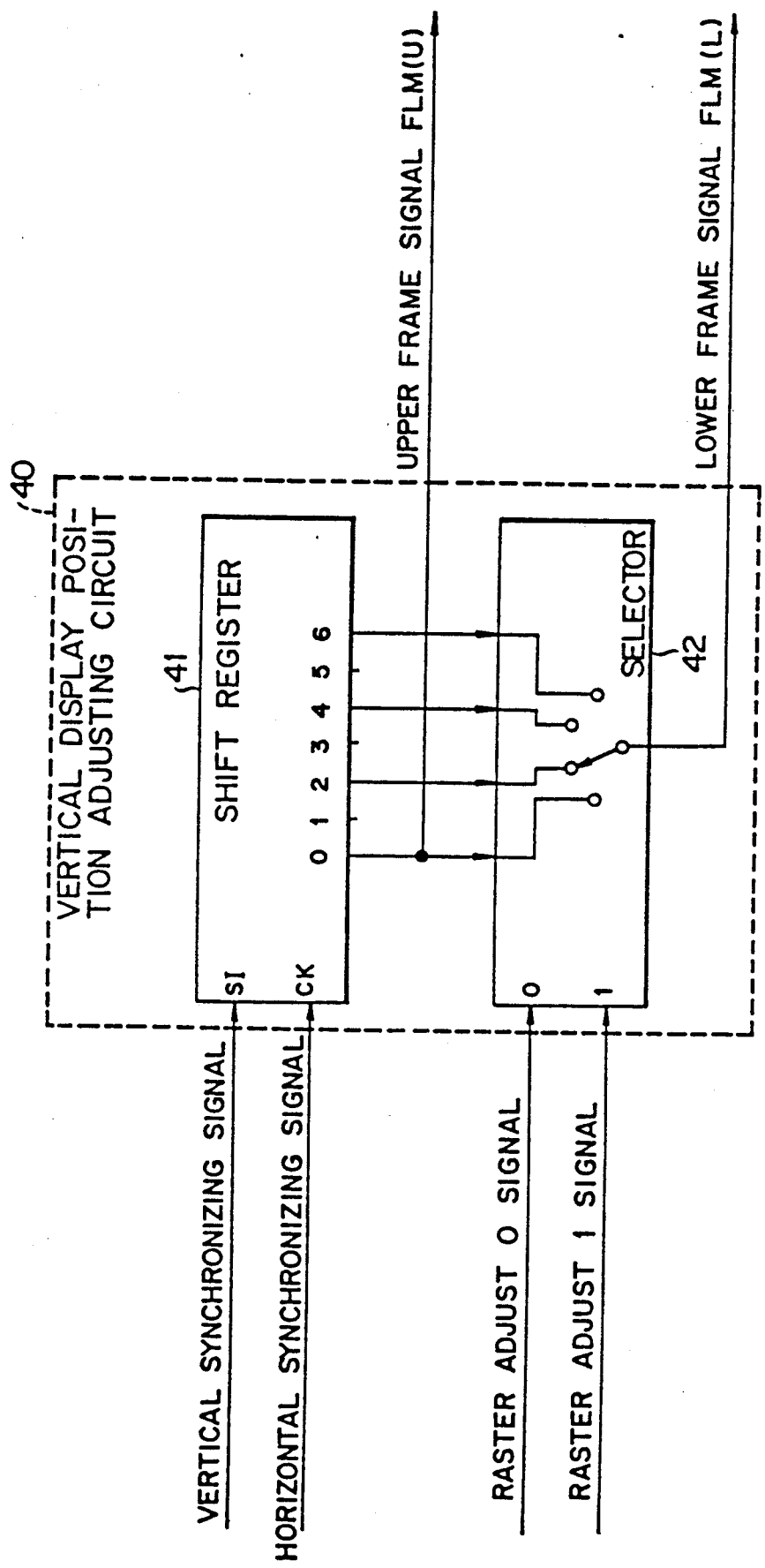
F I G. 4

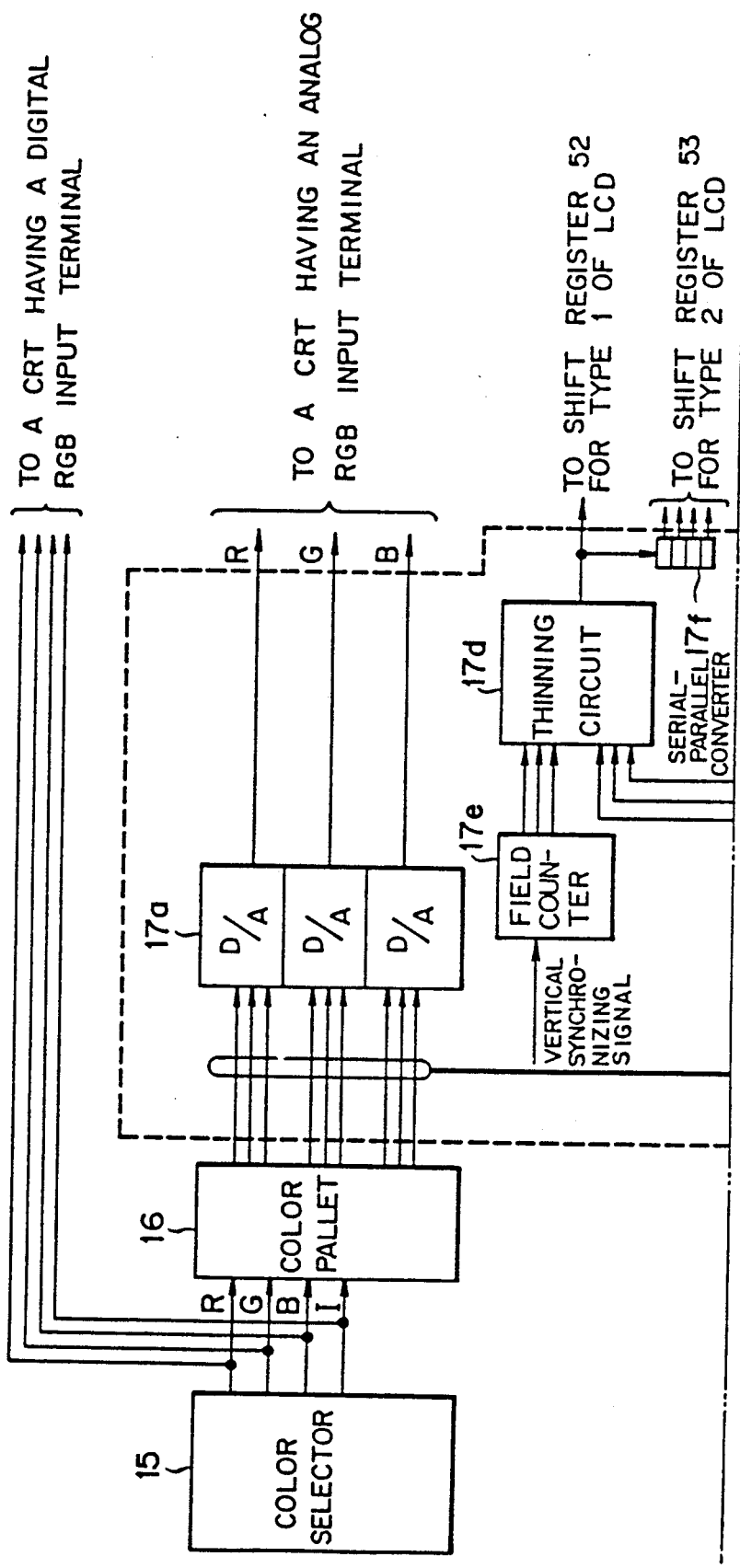

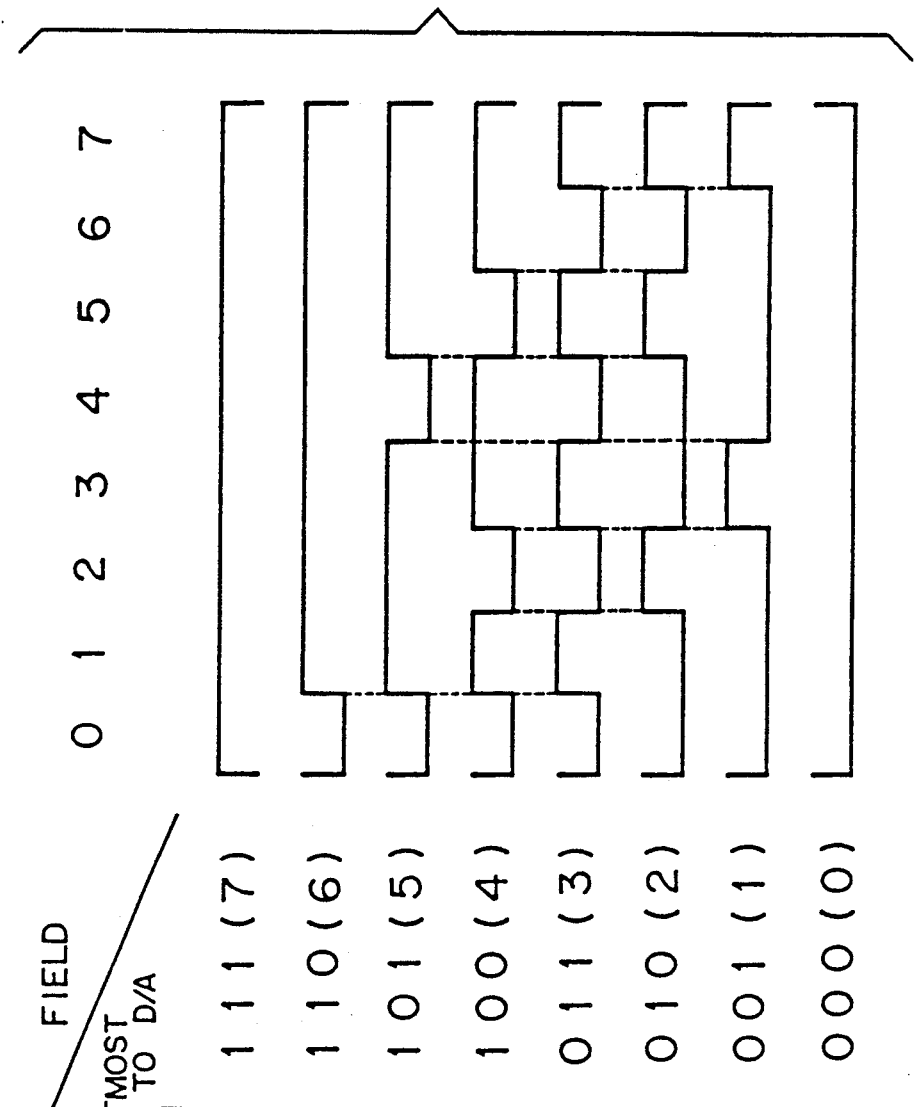

FIG. 6

| DISPLAY CONTROL SIGNAL \ DISPLAY MEANS | IN CASE OF CRT | IN CASE OF LCD (TYPE 1) | IN CASE OF LCD (TYPE 2) | IN CASE OF LCD (TYPE 3) |
|---|---|---|---|---|
| VSY/$FLM_1$,$FLM_0$ | VSYNC | FLM (L) | FLM (L) | FLM (L) |
|  |  | FLM (U) | FLM (U) | FLM (U) |
| HSY/LC | HSYNC | LC | LC | LC |
| SCK |  | SCK | SCK | SCK |
| EWCK |  |  | ECK | WCK |
| B/$LD_0$ | AB | $LD_U$ | $LD_0$ | $LD_0$ |
| G/$LD_1$ | AG |  | $LD_1$ | $LD_1$ |
| R/$LD_2$ | AR |  | $LD_2$   U | $LD_2$   U |
| Y/$LD_3$ | AY |  | $LD_3$ | $LD_3$ |
| CH/M | CH | M | M |  |
| B/$LD_4$ | DB | $LD_L$ | $LD_4$ | $LD_4$ |
| G/$LD_5$ | DG |  | $LD_5$ | $LD_5$ |
| R/$LD_6$ | DR |  | $LD_6$   L | $LD_6$   L |
| I/$LD_7$ | DI |  | $LD_7$ | $LD_7$ |

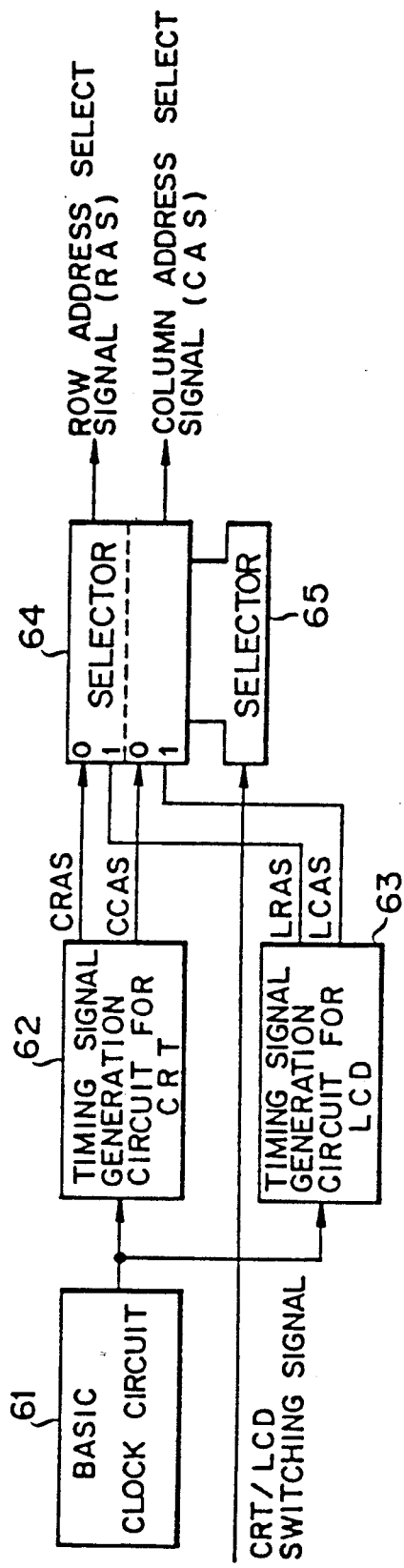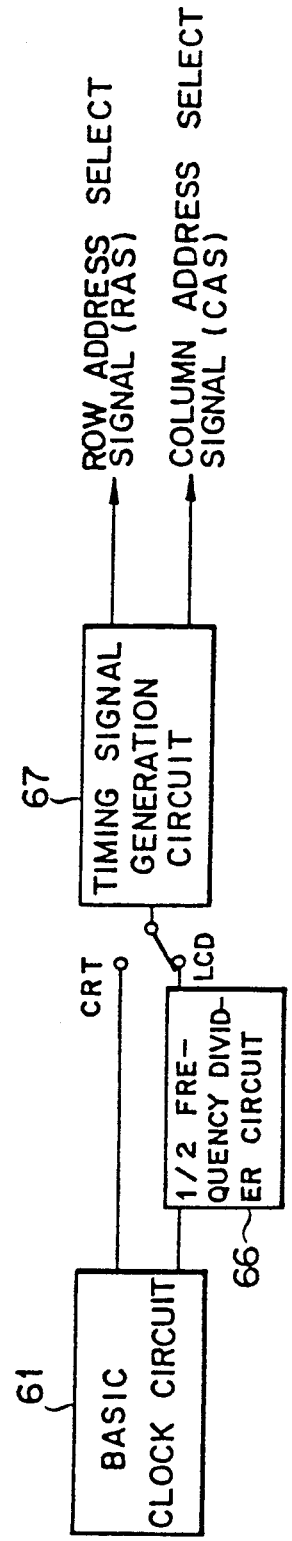

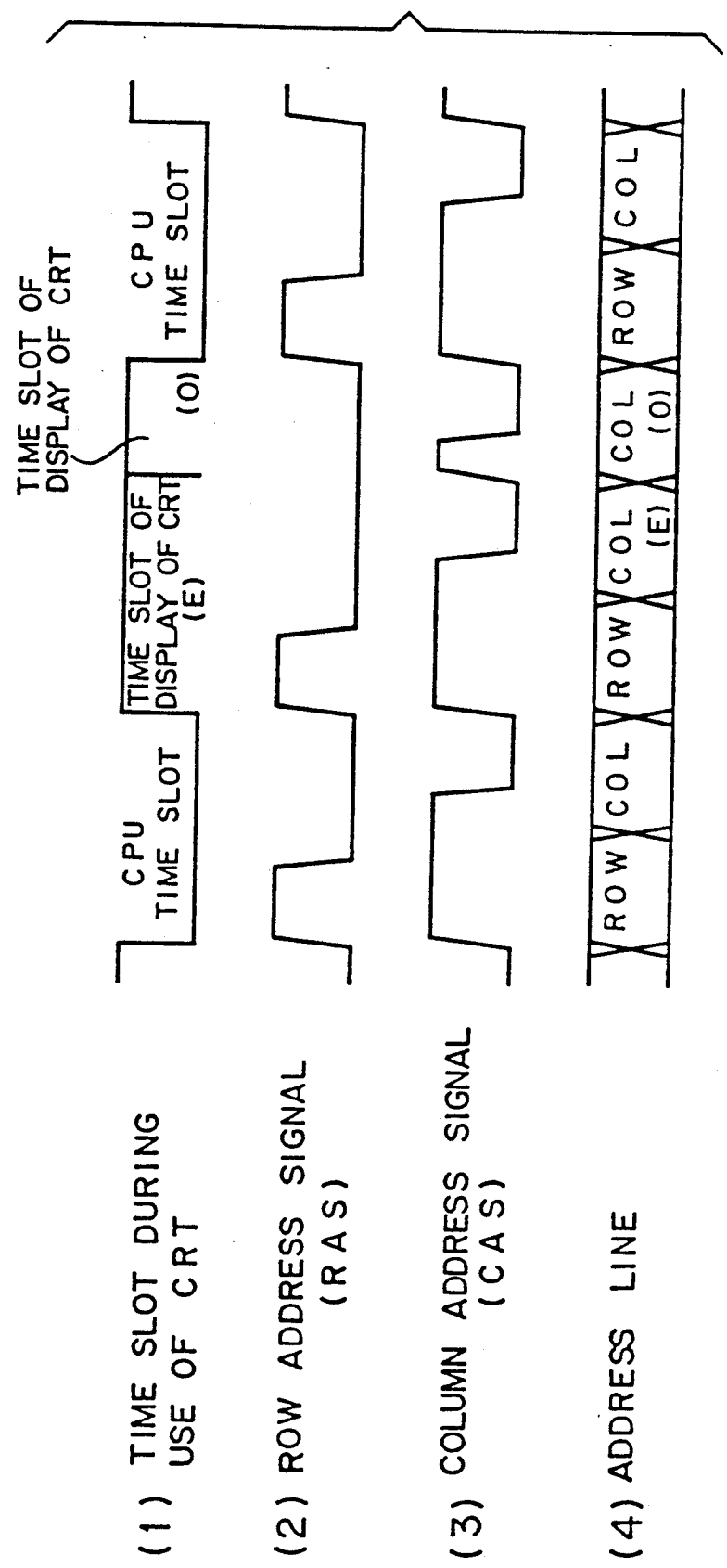

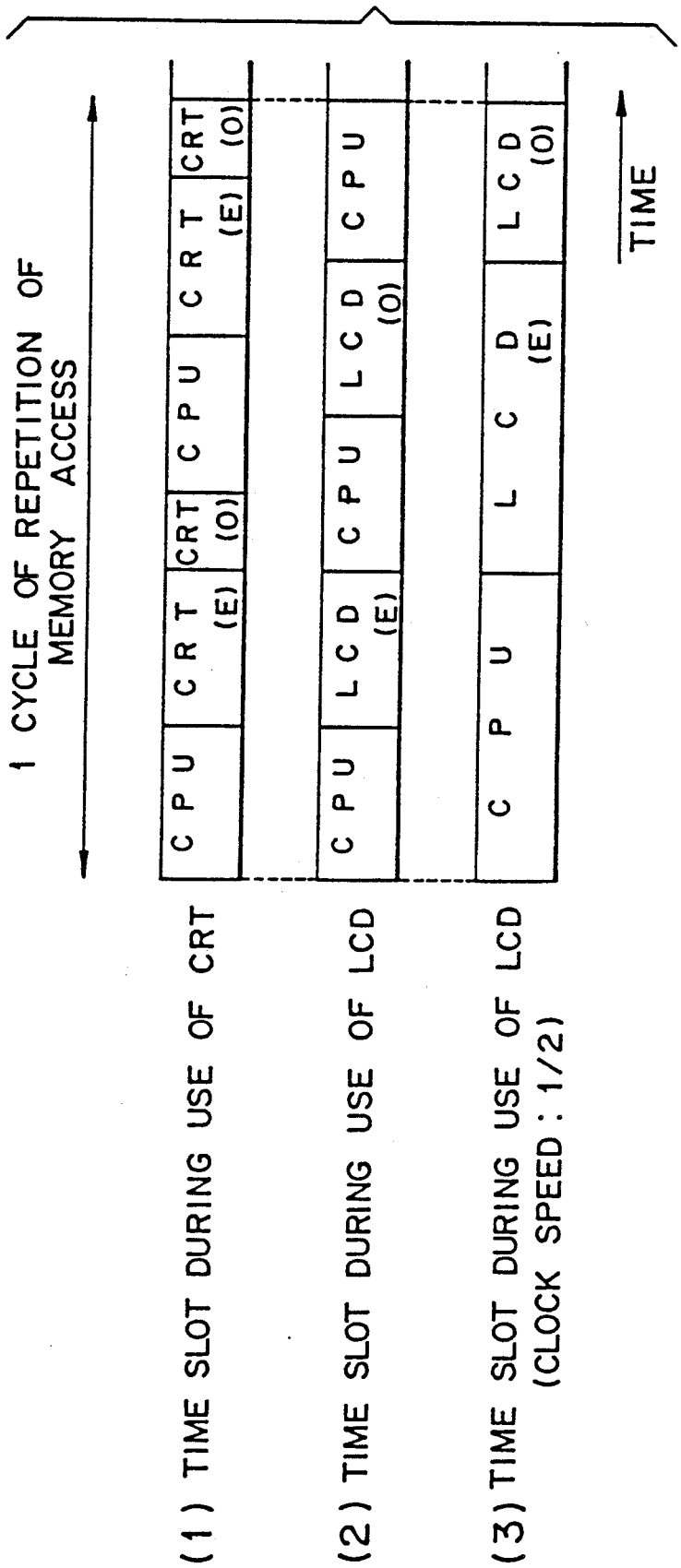

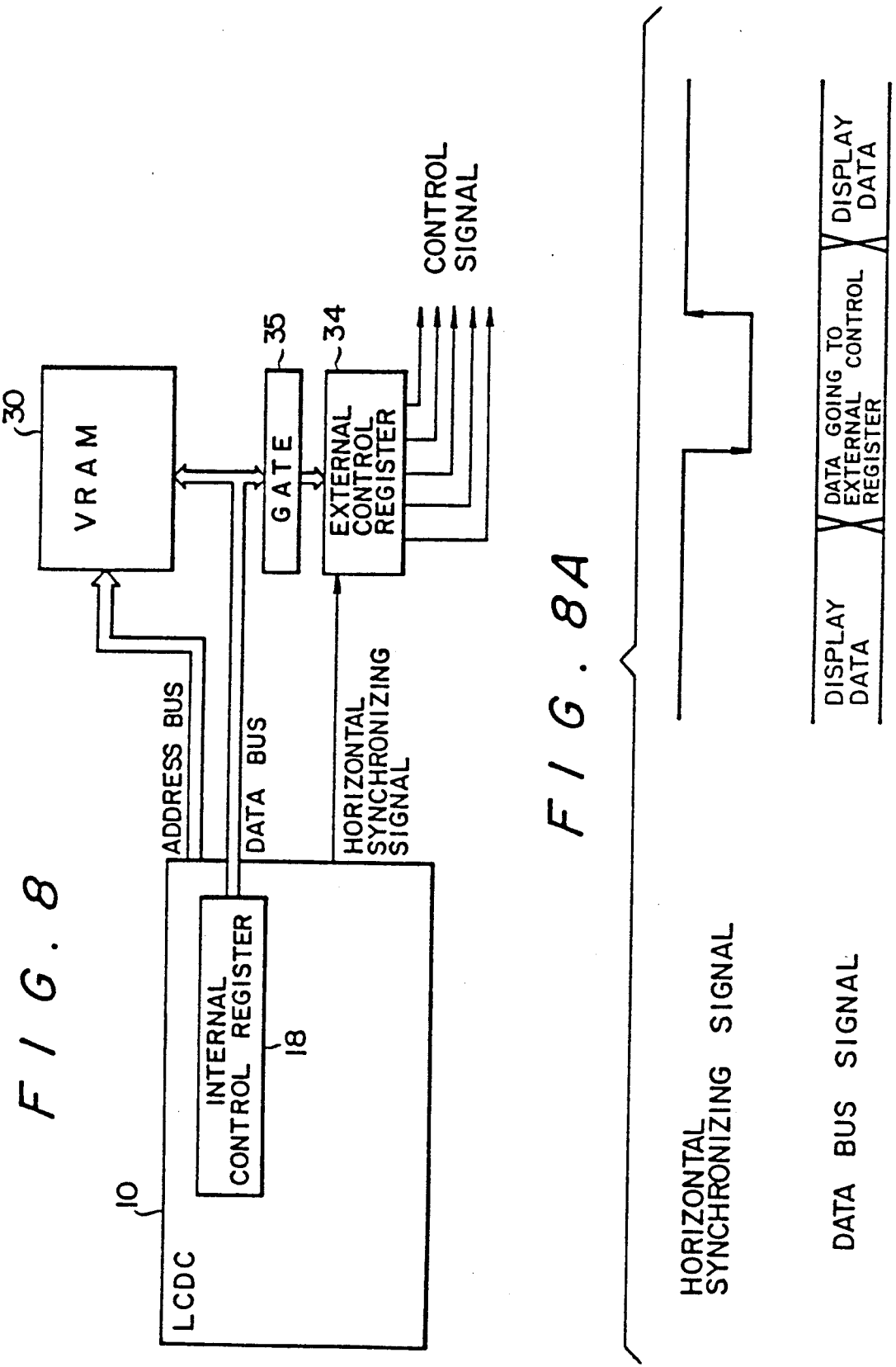

DISPLAY CONTROL SYSTEM

This is a division of application Ser. No. 752,578, filed July 8, 1985 now abandoned.

BACKGROUND OF THE INVENTION

1. Field of the Invention

The present invention relates to improvements and integration in a display control system.

2. Description of the Prior Art

Conventionally, as a display, a liquid crystal display (which is referred to as LCD hereinafter) was smaller in display capacity when compared with a cathode ray tube (which is referred to as CRT hereinafter). For example, CRT could display characters of 80 columns (horizontally) by 25 rows (vertically) per picture, while LCD could display characters of 40 columns by 4 rows only per picture. For this reason, a display control system for LCD was quite different from a display control system for CRT, and neither of the two display control systems could be used in common.

Recently, a hand-held computer (which is referred to as HHC) has been widely applied, and, because of the need of low power consumption, an LCD display system is used for an HHC display system. In this case, LCD is divided in the vertical direction of the screen into two sections, which are positioned closely to each other to provide a parallel display. Also, HHC is highly advancing in performance and function, with the display performance of LCD approaching to that of CRT. Therefore, it is now desired to develop a display control unit or system which is capable of driving both of LCD and CRT display units in the HHC field. The reason why such desire is expressed lies in the recognition that LCD and CRT can be essentially controlled in display in the same manner.

Actually, however, there are some problems to be solved. First, because the display specifications of LCD are fixed physically (for example, the number of the horizontal scanning lines is fixed according to LCDs) and LCD requires no vertical or horizontal retrace lines, such a sufficient display control as in CRT can not be carried out for LCDs having various specifications while the comapatibility of software is perfectly maintained.

Secondly, conventionally, since LCD is unable to provide a gradation or tone display (half tone display), it cannot give the same display as CRT.

Thirdly, because LCD is generally slow in display clock speed, the associated display control system is accordingly slow in speed. This causes slow access from memory, and thus in the LCD display the system performance is reduced when compared with the CRT display.

Fourthly, in the conventional display control systems, external registers can not be added to them. Therefore, the number of necessary circuits must be increased to perform a configuration control when it is necessary.

Fifthly, when the conventional software is used, if the system is expanded in function, the function-expanded portion of the system can not be protected in execution of the software.

SUMMARY OF THE INVENTION

The present invention aims at eliminating the drawbacks found in the prior art display control systems.

Accordingly, it is a principal object of the invention to provide an improved and integrated display control circuit system which can realize various specifications while perfectly maintaining the compatibility of the software, can give a gradation display in the LCD display to realize substantially the same access as in the CRT display, provides for configuration controls, and is able to protect the function-expanded portion of the system when the conventional software is used.

To accomplish this object, the invention is provided with mode select means to select either a mode for controlling the display of CRT or a mode for controlling the display of LCD, means to execute the CRT display control, and means to execute the LCD display control.

The above and other related objects of the invention will be readily seen by reference to the following detailed description when considered in connection with the accompanying drawings.

BRIEF DESCRIPTION OF THE DRAWINGS

FIG. 2 is a view to explain the functions of an I/O register employed in the above embodiment;

FIG. 3 is a view to explain the contents of the register bank of the invention;

FIG. 4 is a circuit diagram of a circuit for adjusting vertical display positions;

FIG. 6 is a view to illustrate display control signals relative to their respective display means;

FIG. 7A is a block diagram of a circuit which is used to speed up memory access to high speeds for liquid crystal display;

FIG. 7B is a block diagram of a circuit used not to speed up memory access for the liquid crystal display;

FIG. 7C is a view to illustrate an ordinary time slot during use of CRT;

FIG. 7D is a view to illustrate one cycle of repetition of memory access;

FIG. 8 is a view to illustrate an external control register;

FIG. 8A is a time chart of the external control register;

DETAILED DESCRIPTION OF A PREFERRED EMBODIMENT OF THE INVENTION

Figure 1B:
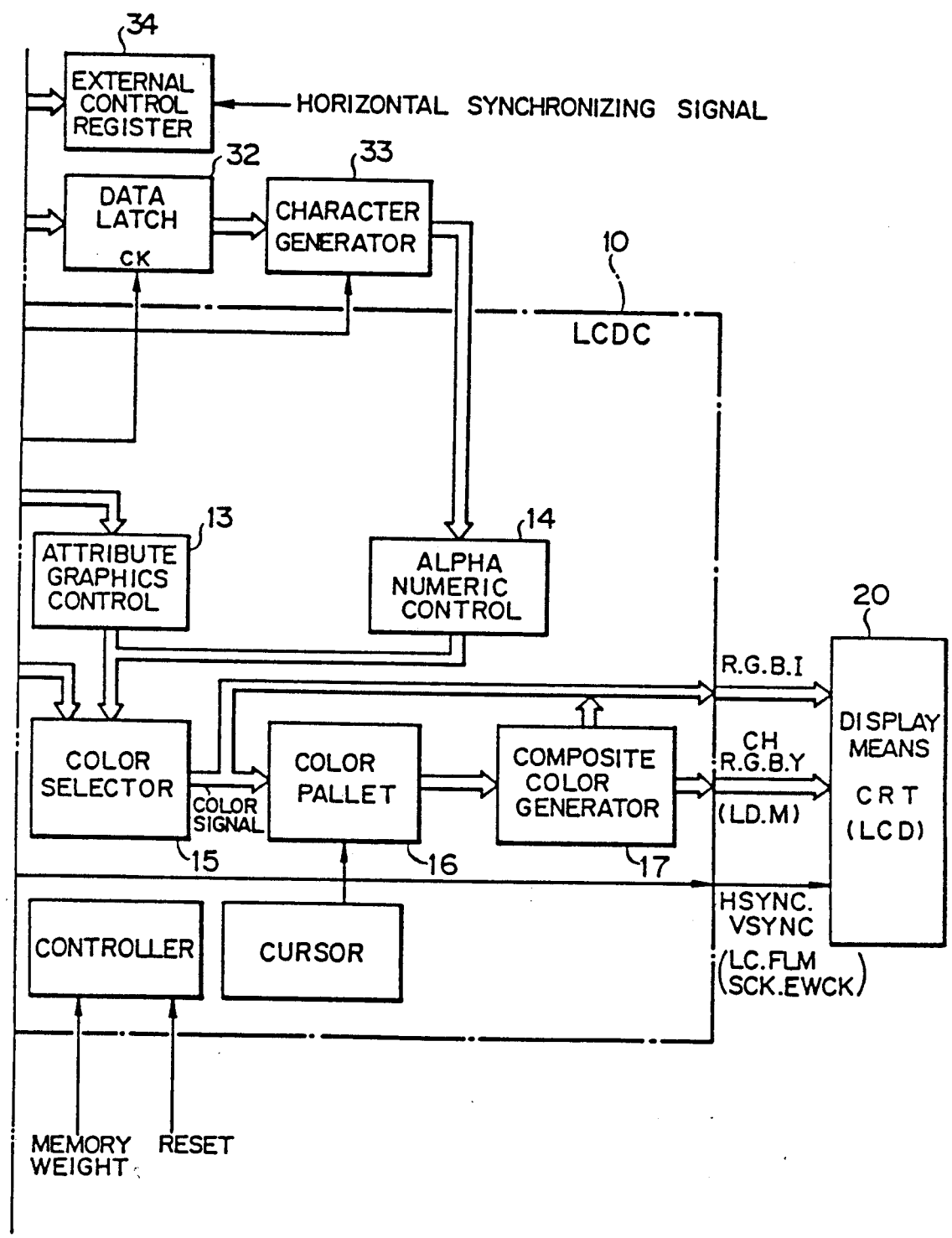
FIG. 1 made up of FIGS. 1a and 1b is a block diagram of an embodiment of the invention.

In FIG. 1, there is illustrated an embodiment of the invention in block forms.

LCDC designated by the numeral 10 is an LSI for controlling the display of LCD or CRT, and LCDC 10 includes a CRT controller 11, a driver 12 for amplifying data signals, an attribute graphics control 13, an alphanumeric control 14, a color selector 15, a color pallet 16 for converting colors, a composite color generator 17, and a mode select register 71. CRT controller 11 generates a timing signal in accordance with parameters when they are set. Color Selector 15 outputs a 4-bit digital signal for specifying colors when a CRT is used as display means 20. Composite Color Generator 17 converts digital electrical signals into analog signals and also generates output signals according to respective three types, or type 1 to type 3 of LCD, in order to create Y signals and analog RGB signals.

LCDC 10 further includes an internal control register 18 and circuits shown in FIG. 1.

CRT or LCD is used as display means 20.

Externally of LCDC 10 there are provided VRAM (RAM for video) 30 comprising a DRAM or an SRAM, an address latch 31 for latching address signals from CPU, a data latch 32 for latching data from LCDC 10, a character generator 33 for converting character information into dots in accordance with signals from Data Latch 32, and an external control register 34 for receiving data from Internal Control Register 18.

Next, we will generally describe the operation of the above-mentioned embodiment of the invention.

Referring now to FIG. 2, there is illustrated all of an I/O register provided in LCDC 10. This I/O register has a plurality of register functions which are different from one another.

Here, to display characters on CRT as Display Means 20, a data signal from CPU (not shown) is once written into VRAM via Driver 12. CRTC 10 reads out VRAM 30 repeatedly according to the synchronization and scanning of CRT. The data read out is then latched into Data Latch 32, is next converted into dots by Character Generator 33 and alphanumeric control 14, and is finally converted into a color signal by Color Selector 15 which is thereafter delivered to CRT. Also, when it is desired to carry out color conversion, Color Pallet 16 is used. The color signal is converted from its digital form into an analog signal by Composite Color Generator 17 and is then forwarded to CRT in the form of a Y signal.

On the other hand, when LCD is used as Display Means 20, such D/A conversion as mentioned above is not carried out in Composite Color Generator 17, but another operation is used to control the display of LCD. This operation will be described later. When LCD is used, signals to be forwarded to the LCD are shown enclosed by ( ) in the interface between LCDC 10 and Display Means 20 in FIG. 1.

In this manner, the above-mentioned interface is used by both CRT and LCD in common.

If D (HEX), or "1101" is sent to I/O Register as an address signal, then the data "P, D6, --- --- ---, D0" can be written, as shown in the table of FIG. 2. This data is used to specify a register which has a function as an address of the register bank shown in FIG. 3. Here, the above-mentioned "P" is a protect bit to be described later. Except this bit "P", other seven bits or "D6, --- --- ---, D0" are identical with addresses shown in FIG. 3.

The corresponding relationship between these adresses and the respective register functions is also illustrated in FIG. 3.

For example, if the seven bits "D6, --- --- ---, D0" in the address D(HEX) in FIG. 2 are "1100101", the data of 7 bits in FIG. 3 can perform a register function as a monitor control. In this instance, bit 7 is a bit to select a mouse or a light pen as input means: that is, when it is "1", it selects the mouse; and, for "0" it selects the light pen. Bit 6 is one to select either SRAM (static RAM) or DRAM ( dynamic RAM) as VRAM 30 shown in FIG. 1: when it is "1", it selects SRAM; and, for "0" it selects DRAM. Bit 5 is used to select either LCD or CRT as Display Means 20. For "1" it selects LCD, and for "0" it selects CRT.

Figure 4A:
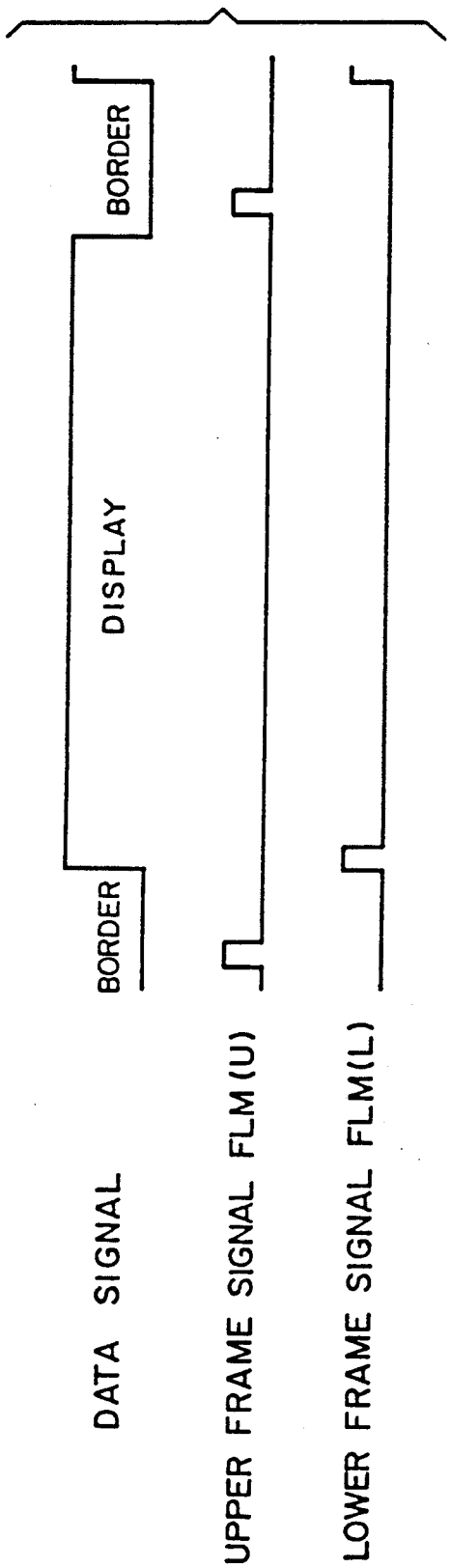
FIG. 4A is a time chart to illustrate the relationship between the data signal and the flame signal.

On the other hand, if 7 bits "D6, --- --- ---, D0" in the address D(HEX) in FIG. 2 are "1100110", then the data of 8 bits in FIG. 3 can perform a register function as a test/LCD control/raster adjustment. In this case, bits 5, 4, 3, 2 are respectively used to select the types 1-3 of LCD (each of the three types will be explained afterwards), and bits 1, 0 are used to select the amount of vertical display position (raster adjustment) which will be discussed in detail later in connection with FIG. 4.

FIG. 4 illustrates a vertical display position adjusting circuit employed in the present invention.

A vertical display position adjusting circuit 40 is composed of a shift register 41 and a selector 42. Shift Register 41 receives a vertical synchronizing signal and a horizontal synchronizing signal as a clock, and allows the horizontal synchronizing signal to output 0, 1, --- ---, 5, 6 signals that are respectively delayed. The output signal that has the same timing as the input horizontal synchronizing signal provides an upper frame signal FLM (U) which is used to set timing in scanning an upper liquid crystal 43 provided in the vertically upper portion of a screen, (see FIG. 4B).

Selector 42 selects the output signals from Shift Register 41 and send out the selected signal as a lower frame signal FLM (L). The lower frame signal FLM (L) is used to set timing in scanning a lower liquid crystal 44 provided in the vertically lower portion of the screen (see FIG. 4B), and is also used to vary the display phase of Lower Liquid Crystal 44 relative to the display phase of Upper Liquid Crystal 43 in accordance with the number of the scan lines of the screen. In the illustrated embodiment, the display phase of Upper Liquid Crystal 43 leads that of Lower Liquid Crystal 44. The above-mentioned upper and lower liquid crystals 43 and 44 are positioned closely to each other so as to form one screen.

Figure 4B:
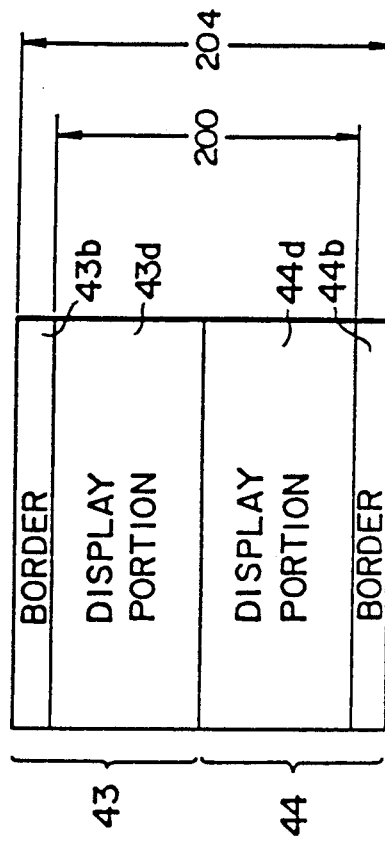
FIG. 4B is a view to show the display status in LCD.

For example, as shown in FIG. 4B, when a screen of 640×200 is displayed using an LCD of 640×204, it is necessary to lower an upper liquid crystal display portion 43d by two scan lines for the border 43b of Upper Liquid Crystal 43. For this reason, the lower frame signal FLM (L) lags by two scan lines. This status can be seen in FIG. 4A.

In FIG. 4, the amount of the lag or delay of the lower frame signal FLM (U) can be controlled by varying a raster adjust 0 signal (which is designated by RAJ 0 in FIG. 3) and a raster adjust 1 signal (which is designated by RAJ 1 in FIG. 3). That is, if the raster adjust 0 signal and raster adjust 1 signal are set for "0,0", "0, 1", "1, 0", "1, 1", then the number of the delayed lines will be 0, 2, 4, 6, respectively. Thus, proper adjustment of the number of the delayed lines prevents any breaks from being produced in the display portion between the upper and lower liquid crystals 43 and 44.

Referring now to FIG. 5, there is shown a circuit diagram to illustrate the details of the above-mentioned composite color generator 17. This circuit 17 generates a display control signal for CRT display and a display control signal for LCD display, and, as the LCD display control signal, it produces three kinds of control signals which are used for the three types of LCD, or type 1, type 2 and type 3, respectively.

A D/A converter 17a receives digital signals R, G, B from Color Pallet 16 and then converts these digital signals into analog signals, respectively. The converted analog signals are used as display control signals for CRT. An adder 17b inputs the respective digital signals R, G, B coming from Color Pallet 16, performs the operation (4G+2R+B), weights the operation result to provide a binary value, and finally outputs the binary value in a predetermined number of bits. A D/A converter 17c converts the output signal of Adder 17b into an analog signal and outputs the analog signal to CRT as a Y signal (brightness signal).

A thinning circuit 17d converts the duty cycle of a voltage to be applied to LCD, dot by dot, according to the brightness of dots to be displayed on the LCD, and also determines (thins out) an output value each vertical scan. This thinning circuit 17d is composed of a ROM, and its output signal is display control data for Type 1 of LCD (to be described later) to be delivered to a shift register 52 (see FIG. 5a).

A field counter 17e counts the vertical synchronizing signals and outputs the results in 3 bits. Based on the 3-bit output signal and the four leftmost bits of the output signal from Adder 17b, the above-mentioned thinning-out operation is performed in Thinning Circuit 17d.

A serial-parallel converter 17f converts the output signals from Thinning Circuit 17d into 4-bit parallel signals. The output signal of Converter 17f is a display data signal for Type 2 of LCD (to be described later), which signal is to be delivered to a shift register 53, (see FIG. 5d).

A latch circuit 17g latches the four leftmost bits out of the output signal of Adder 17d, and also outputs a brightness weight signal for LCD. This output signal from Latch Circuit 17g is a display data signal for Type 3 of LCD (to be described later), which signal will be fed to a shift register 54 (see FIG. 5e).

Figure 5B:
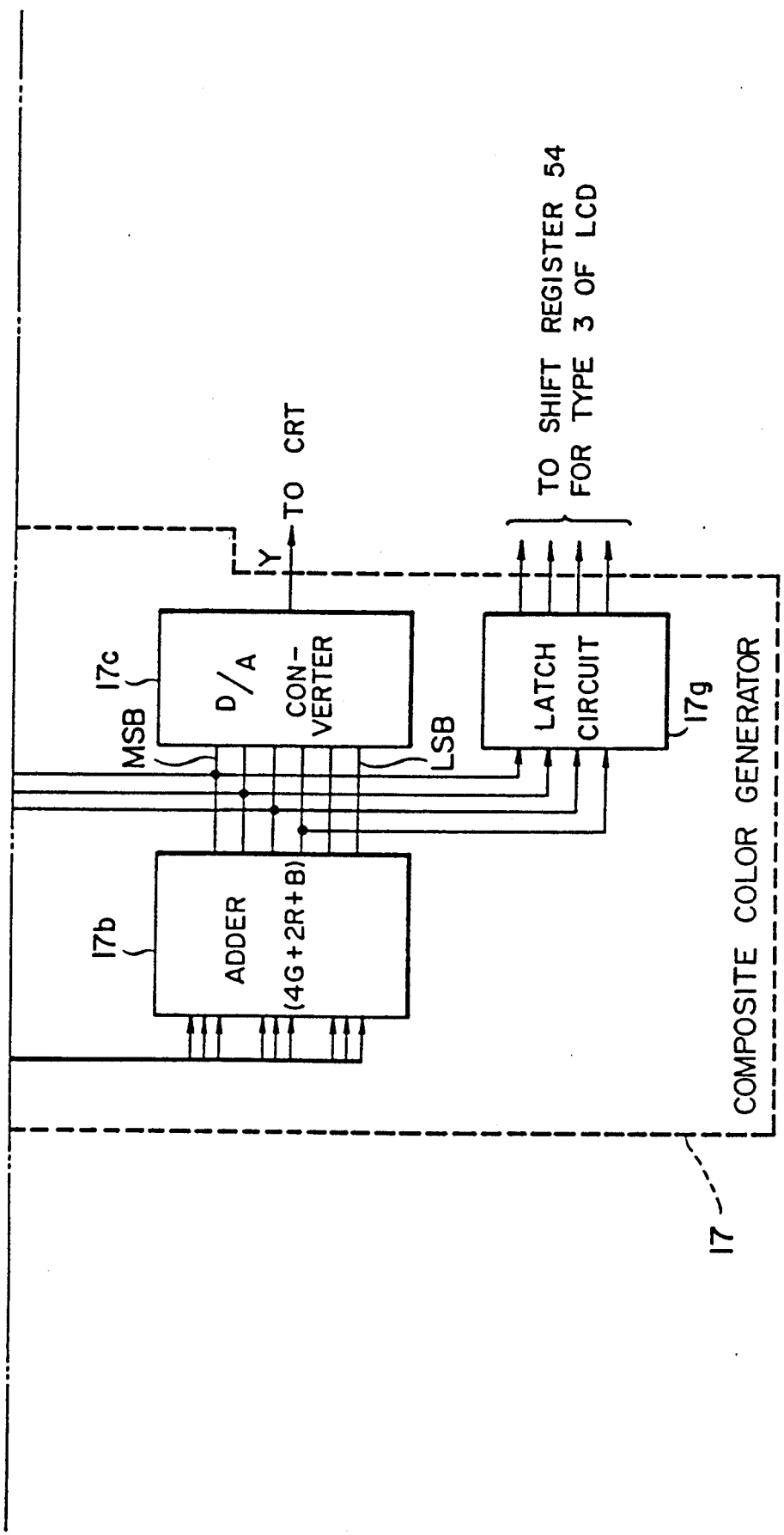
FIG. 5 made up of FIGS. 5a and 5b is a block diagram to illustrate the details of a composite color generator employed in the invention.
FIGS. 5c, 5d and 5e are views respectively showing how a shift register included in each type of LCD segment driver is arranged.
FIG. 5f is a view to illustrate the relationship between fields and the three left-most bits before Y signals are converted from digital electrical signals into analog signals when types 1, 2 of LCD are used.
FIG. 5g is a view to illustrate the combination of the minimum unit times of brightness.
Figure 5C:
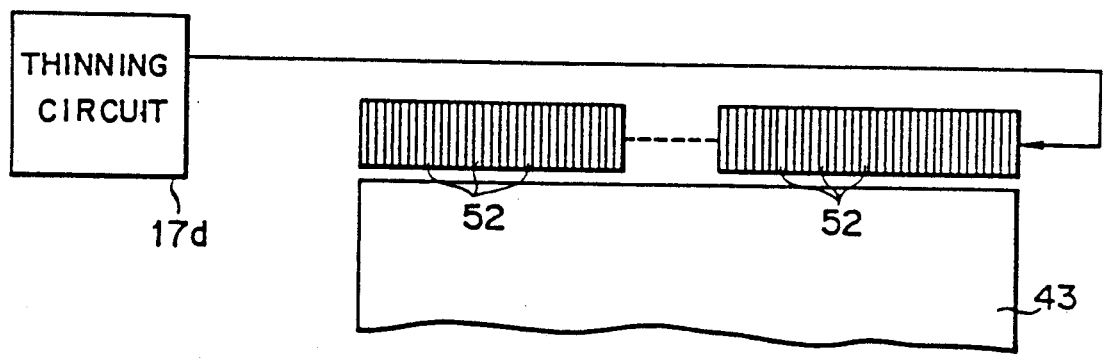
Figure 5D:
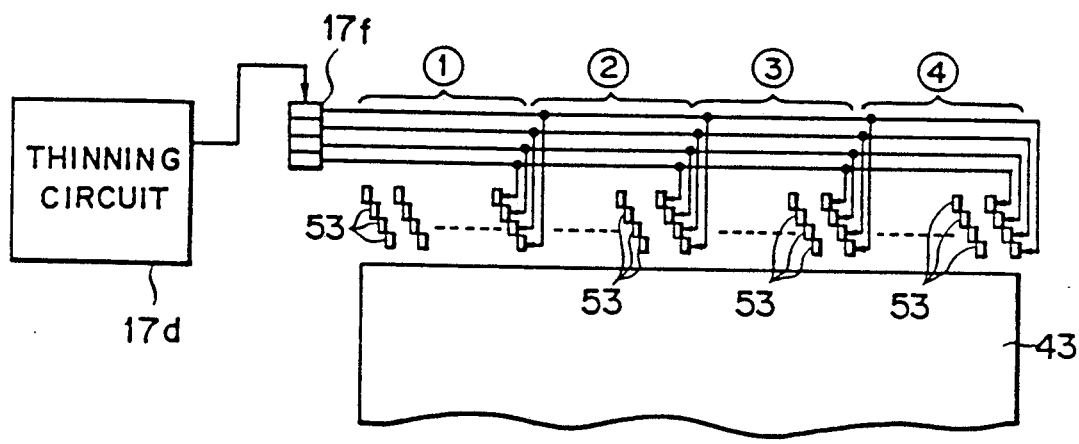
Figure 5E:
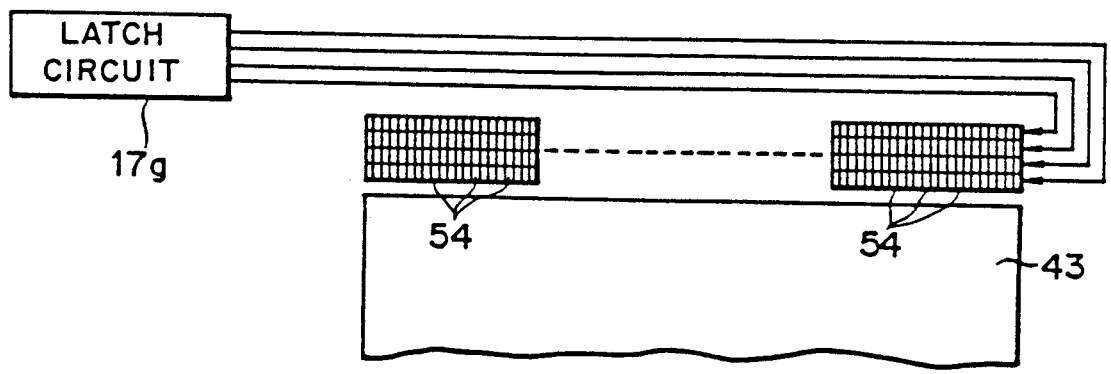

FIGS. 5c–e are views to respectively illustrate how a shift register included in each of LCD segment drivers is arranged.

In these figures, latches are omitted which exist between the respective shift registers 52, 53, 54 and the liquid crystal 43.

Within CRT Controller 11 there is included a WCK weight clock circuit which counts down SCK clock in accordance with the EH bits 4–0 of the address 67 (HEX) in FIG. 3 to produce a weight clock WCK.

In FIG. 5c, there is illustrated an arrangement in which Thinning Circuit 17d is used to control the above-mentioned application of voltage for each one vertical scan on the screen in one dot. This is the type 1 of LCD. In other words, the same number of flipflops 52 as that of horizontal dots of Liquid Crystal 43 are provided to form one serial shift register. The output signals of Thinning Circuit 17d are sequentially applied to this shift register so as to perform a predetermined display.

FIG. 5f illustrates the data obtained when eight steps of gradation control have been performed in the types 1 and 2 of LCD. Namely, when a given number of fields out of 8 fields are thinned out according to the brightness, no voltage will be applied to the dots associated with the given number of fields. In this way, the average brightness can be controlled in 8 stages.

Here, let us consider a given number of fields (e.g. 8 fields) as one unit and, among these 8 fields, pay our attention to a preselected dot. When it is desired to make the brightness of the dot highest, the voltage is applied to the flipflop 52 corresponding to the dot over all of the eight fields. This is illustrated as bit "1 1 1" in FIG. 5f. When it is desired to make the brightness intermediate, an input signal to the flipflop 52 corresponding to the dot is thinned out a given number of times (over the given number of fields). This is shown in FIG. 5f, for example, as bit "1 0 0". That is, in this case, the input signal is thinned out over 3 fields out of 8 fields. This thinning operation is carried out by Thinning Circuit 17d.

In FIG. 5d, there is illustrated another arrangement basically similar to the above-mentioned LCD type 1. In this arrangement, however, instead of arranging serially all of the flipflops 52 to form one shift register, a given number of flipflops 53 are arranged to form one shift register so as to provide a plurality of parallel shift registers. This is the LCD type 2. In this type, it is possible to reduce the power consumption of the flipflops 53 over the LCD type 1. The principle described above in connection with FIG. 5f can be applied to this case as well. Specifically, in FIG. 5d, 80 flipflops are used to form one shift register, and there are four such shift registers in amount (they are designated by 1, 2, 3, 4, respectively). The brightness information from Thinning Circuit 17d is stored in the order of 1, 2, 3, 4, and the storage can be switched by Clock ECK.

In FIG. 5e, there is illustrated still another arrangement in which the minimum unit time of the width of the brightness is given for each dot to control the application of voltage to Liquid Crystal 43. This is the LCD type 3. The above-mentioned minimum unit time of the brightness width may be, for example, one-sixteenth of a half cycle of a current alternating signal or a signal for converting d.c. into a.c. (time for driving 1 dot, that is, time for driving 1 line). Four bits are used to execute this operation and the respective bits have significances or weight widths 1, 2, 4, 8 times the above-mentioned minimum unit time, respectively. Namely, each of the four bits is given its own weight. Thus, in the LCD type 3, for each dot, the minimum unit time and the weight width is combined with each other according to the values of the 4 bits to control the above-mentioned voltage application time.

Figure 5G:
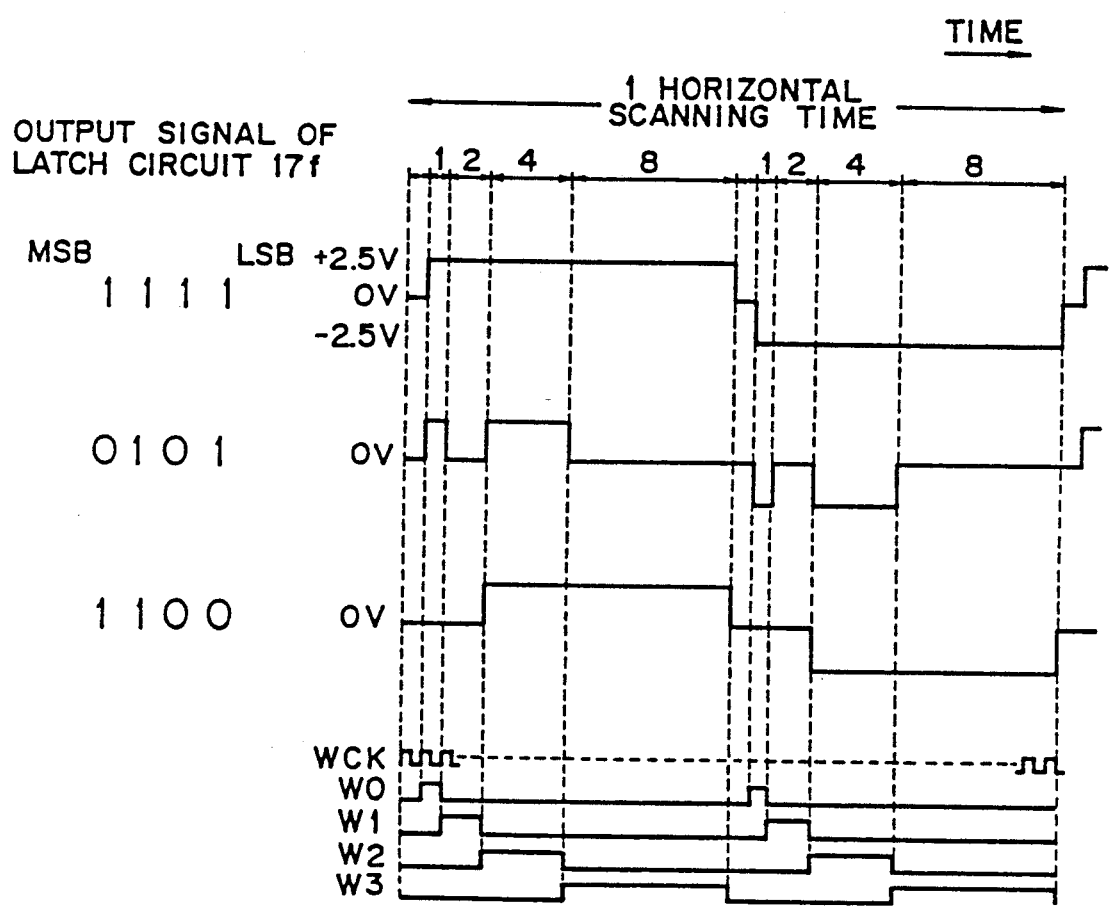

Referring now to FIG. 5g, there is shown an example of the relationship between the output signals of Latch Circuit 17g and the drive wave forms of LCD.

Specifically, the voltage is applied to the liquid crystal for a time which is one of integral multiples of the minimum unit time of the width of the brightness in accordance with the brightness within 1 horizontal scan time. This permits 16-step control of the average brightness. In case of FIG. 5g, the application of voltage to the liquid crystal is performed in a predetermined duty waveform in accordance with a current alternating signal having +2.5 V and −2.5 V. In CRT Controller 11, pulses W0, W1, W2, and W3 are produced based on the weight pulse WCK. Pulse W0 is a pulse corresponding to the minimum unit time of the brightness width. Pulses W1, W2, and W3 are respectively pulses which have widths 2, 4, and 8 times that of Pulse W0, respectively. When the output signal of Latch Circuit 17g is "1 1 1 1", it is desirable that the current alternating signal be applied over all of 1 horizontal scan time, but there may be present a slight clearance in it.

In other words, LCD is controlled based on the signals that can be obtained after the respective display control signals of LDn shown in FIG. 6 ("n" represents integers 0 −7, while "LDn" is the digital information sent from Shift Register 54 and is composed of 4 bits) and the above-mentioned pulses W0, W1, W2, and W3 are processed in logical circuits. In particular, there are provided four AND circuits and one OR circuit: LD0 and W0 are processed in the first AND circuit; LD1 and W1 are processed in the second AND circuit; LD2 and W2 are processed in the third AND circuit; and, LD3 and W3 are processed in the fourth AND circuit. Then, the output signals of the above-mentioned four AND circuits are input to the above-mentioned OR circuit, and based on the output signal of the OR circuit, LCD can be controlled in brightness.

In this way, a plurality of intermediate brightnesses (half tones) of the dot can be set.

FIG. 6 is a table to illustrate the display control signals with respect to the respective display means.

In this table, there are illustrated the display control signals that are generated in case of CRT as well as in case of LCD types 1-3, respectively. Here, VSYN is a vertical synchronizing signal and HSYN is a horizontal synchronizing signal. LC represents a clock for fetching a video signal from a shift register to a latch; SCK stands for a clock which delivers the video signal to the shift register; ECK denotes a clock for enabling the driver of LCD; and, WCK expresses a clock which will be a unit of the weight of the brightness. Characters B, G, R, and Y stand for a blue primary color brightness signal, a green primary color brightness signal, a red primary color brightness signal, and a monochromic brightness signal, respectively. Also, CH is a chrominance phase signal and M is a current alternating signal. In this figure, U and L are used to express upper and lower liquid crystals, respectively.

Figure 7:
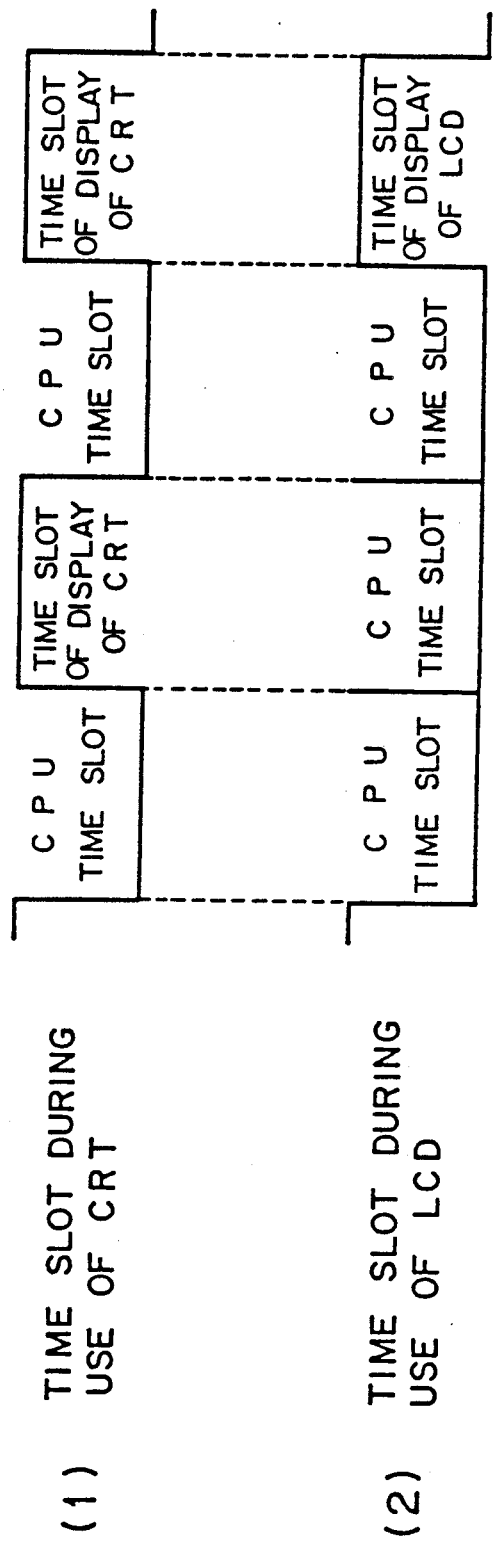
FIG. 7 is a view to illustrate the relationship between CPU time slot and display time slot.

Referring now to FIG. 7, there is shown the relationship between CPU time slot and display time slot.

In particular, in (1) of FIG. 7, there are illustrated CPU time slots as well as the display time slots of CRT, both of which are generated repeatedly with the almost same length with each other. On the other hand, in (2) of FIG. 7, there are shown CPU time slots and a display time slot of LCD, with the length of the CPU time slot being set substantially as 3 times the length of LCD display time slot.

Referring generally to (2) of FIG. 7, the total time of the LCD display time slots is decreased, while the total time of the CPU time slots is increased. This aims at speeding up the operation of CPU. Specifically, since the access speed of LCD is generally slower than that of CRT, the decrease of the LCD display time slot produces no troubles but provides a spare time. Thus, the spare time can be used as the CPU time slot to speed up the CPU operation.

In FIG. 7A, there is illustrated a circuit for speeding up the memory access during liquid crystal display.

In this figure, basic clocks from a basic clock circuit 61 are delivered to a timing signal generation circuit for CRT 62 and a timing signal generation circuit for LCD 63. CRT timing signal generation circuit 62 sends a low address select signal for CRT, CRAS, and a column address select signal for CRT, CCAS, to a selector 64. LCD timing signal generation circuit 63 feeds a low address select signal for LCD, LRAS, and a column address select signal for LCD, LCAS, to Selector 64.

Also, a selector 65 receives a CRT/LCD switching signal indicating which of CRT and LCD should be used as Display Means 20, and allows Selector 64 to output the CRT low address select signal CRAS or the LCD low address select signal LRSA as the low address select signal, as well as the CRT column address select signal CCAS or the LCD column address select signal LCAS as the column address select signal CAS.

As a result of this, the time slot during use of CRT shown in FIG. 7 as (1) and the time slot during use of LCD in the same figure as (2) can be switched to each other, or they can be used in a switched manner. Within 1 cycle of repetition of the memory access, two CPU time slots are obtained in the time slot for CRT, while in the time slot for LCD three CPU time slots are obtained. This means that in the LCD time slot the processing of CPU is accelerated to some degree. In the drawings, CPU stands for a CPU time slot; LCD for a LCD time slot; CRT for a CRT time slot; (E) for the even-numbered order; and, (O) for the odd-numbered order.

In FIG. 7C, there is shown a general time slot when CRT is used. In this figure, ROW represents a low address signal and COL denotes a column address signal.

In FIG. 7B, there is shown a circuit in which the CPU access for the LCD display is slower than that for the CRT display. In this circuit, when a basic clock, as it is, is sent to a timing signal generation circuit 67, the time slot for CRT shown in (1) of FIG. 7D is executed; and, when the basic clock is once divided by a frequency divider circuit 66 into a half-frequency one and is then sent to Timing Signal Generation Circuit 67, the time slot for LCD shown in (3) of FIG. 7D is carried out. Accordingly, the memory access for LCD is faster in the circuit shown in FIG. 7A than in the circuit in FIG. 7B.

Referring now to FIG. 8, there is shown a circuit diagram in which an external control register is included.

In FIG. 8, an internal control register 18 is provided in LCDC 10, and an external control register 34 is provided externally of LCDC 10. Both control registers 18 and 34 are connected to each other via a data bus. A gate 35 accepts data while a horizontal synchronizing signal is present. Therefore, External Control Register 34 is able to receive data from Internal Control Register 18 while the horizontal synchronizing signal is appearing.

External Control Register 34 includes various applications. For example, it can be used to store a signal which selects CRT or LCD, or it can be used as an external page register. Thus, use of External Control Register 34 provides an advantage that a configuration control is possible.

Figure 8B:
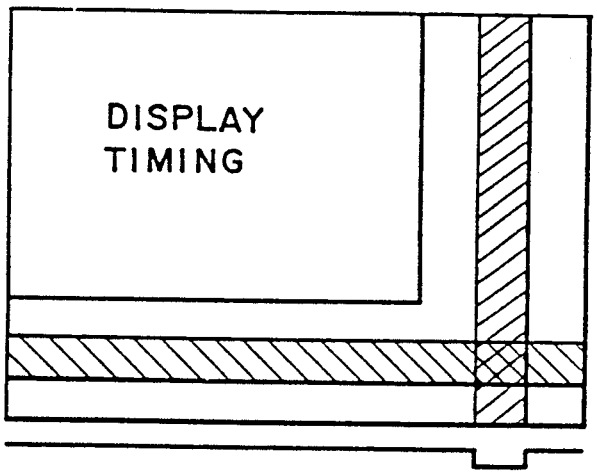
FIG. 8B is a view to illustrate the relationship between a horizontal synchronizing signal and a data bus signal; and, FIG. 9 is a circuit diagram of a circuit used to protect one or more predetermined bits.

In FIG. 8A, there is illustrated a time chart to show the relationship between the horizontal synchronizing signal and the data bus signal. In FIG. 8B, there are illustrated the display timing and the synchronizing signal timing. In this figure, a portion shown by oblique lines represents the synchronizing signal timing.

Instead of the horizontal synchronizing signal, a vertical synchronizing signal may be used. These synchronizing signals are referred to as a strobe pulse.

The circuit arrangement in FIG. 8 is advantageous in that, when establishig External Control Register 34, there is no need to increase the number of ICs and there is no need for new peripheral components.

Figure 9:
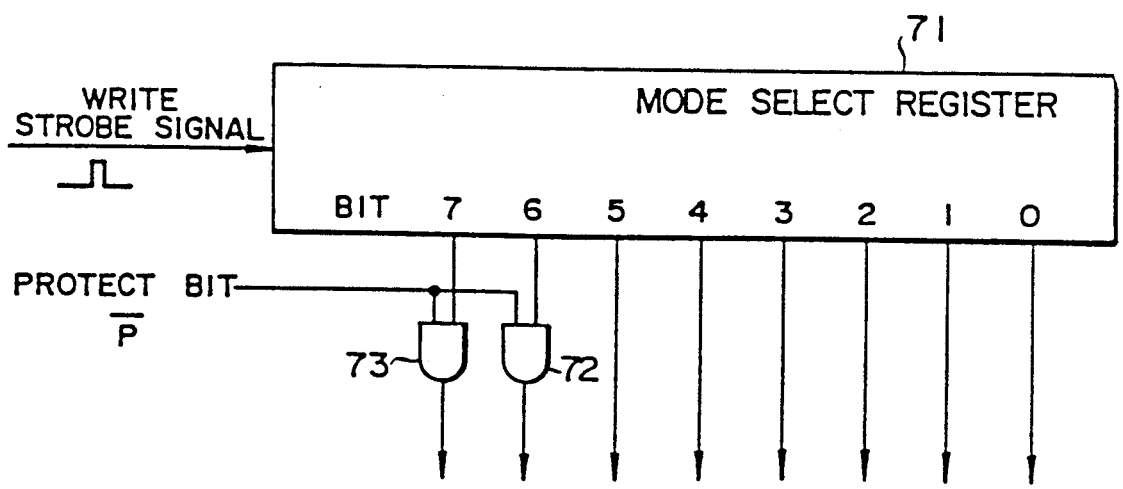

Referring now to FIG. 9, there is illustrated a circuit which protects a predetermined bit.

In FIG. 9, Mode Select Register 71, which is illustrated within LCDC 10 in FIG. 1, receives a write strobe signal from CPU to an address 8 (HEX), and takes in and outputs 8 mode select signals corresponding to bits 0-7. The write strobe signal is output from the port 8 (HEX) of I/O register shown in FIG. 2. The output terminals of Bits 6 and 7 are connected to AND circuits 72 and 73, respectively.

Here, Bit 6 has a significance of an expansion function 160×200 color mode, and Bit 7 has a significance of a standby mode. To the other terminals of AND circuits 72, 73 is applied a signal of the port D (HEX) of I/O Register shown in FIG. 2, that is, the bit 7 of the register bank address or a protect bit "P".

In other words, when the protect bit "P" is "1", Bits 6, 7 of Mode Select Register 71 are output as they are, while when the protect bit "P" is "0", Bits 6, 7 of Mode Select Register 71 are not output. That is, when the protect bit is set, the function-expanded bits are ignored.

Therefore, conventionally, since the above-mentioned bits 6, 7 are not used, it seems that some of the software available in the current market is in use without paying any attention to these bits 6, 7. In particular, in the above-mentioned case, since the bits 6, 7 are not defined, they may be "1" or "0", namely, their status cannot be recognized exactly. Generally, when the function is expanded, it is difficult to maintain compatibility between various programs. Even in such case, however, the arrangement of the invention shown in FIG. 9 has an advantage that it can be operated very easily to secure the software compatibility because it requires a single and simple operation to set the protect bit "P" for "0".

As described hereinbefore, the invention has several effects: it can realize various specifications of software while maintaining the software compatibility perfectly; as the gray scale display is possible in the LCD display, it can realize almost the same level of use of the LCD display as that of the CRT display; it is capable of a configuration control; and, when the conventional software is expanded in function, it can protect the function-expanded bits and maintain the compatibility of the software.

What is claimed is:

1. A display control system for a CRT or an LCD display in which a CRT or LCD display time slot and a CPU time slot exist alternately, characterized in that there is provided a time slot control means for controlling the rate of said CPU time slot relative to said CRT or LCD display time slot in accordance with the access speed of the CRT or LCD display wherein CPU operation is increased when said system is controlling an LCD display.

* * * * *